United States Patent
Fujiwara

[11] Patent Number: 5,818,979
[45] Date of Patent: Oct. 6, 1998

[54] IMAGE SCANNER AND IMAGE SCANNING METHOD USING SAME

[75] Inventor: Tatsuo Fujiwara, Kawasaki, Japan

[73] Assignee: Fujitsu Limited, Kawasaki, Japan

[21] Appl. No.: 632,145

[22] Filed: Apr. 15, 1996

Related U.S. Application Data

[63] Continuation of Ser. No. 425,770, Apr. 20, 1995, abandoned, which is a continuation of Ser. No. 133,223, Oct. 7, 1993, abandoned.

[30] Foreign Application Priority Data

Oct. 9, 1992 [JP] Japan .................................. 4-271673

[51] Int. Cl.[6] .................. G06K 7/10; G06K 7/00
[52] U.S. Cl. .................. 382/321; 382/268; 382/317; 235/436
[58] Field of Search .................. 382/321, 323, 382/317, 374, 268, 269, 274; 358/497, 474, 458, 454, 461; 355/236, 235, 239; 235/436, 437

[56] References Cited

U.S. PATENT DOCUMENTS

| | | | |
|---|---|---|---|
| 4,862,512 | 8/1989 | Hidaka et al. | 382/323 |
| 4,970,556 | 11/1990 | Iwata | 355/69 |
| 5,047,871 | 9/1991 | Meyer et al. | 358/474 |
| 5,184,339 | 2/1993 | Tsuchiya | 369/44.28 |
| 5,198,909 | 3/1993 | Ogiwara et al. | 358/486 |
| 5,210,600 | 5/1993 | Hirata | 358/374 |
| 5,255,044 | 10/1993 | Ishiguro | 354/402 |
| 5,276,459 | 1/1994 | Danzuka et al. | 358/503 |

*Primary Examiner*—Jose L. Couso
*Assistant Examiner*—Matthew C. Bella
*Attorney, Agent, or Firm*—Staas & Halsey

[57] ABSTRACT

An image scanner for reading an image data or an image scanning method using the same, wherein the image scanner includes a control circuit obtaining correction data to maintain normal continuity for the image data, by weighting or averaging a plurality of image data when a drive motor for a carrier including a reading head, is decelerating or accelerating, in the case when the reading restarts after the reading operation has been interrupted.

19 Claims, 16 Drawing Sheets

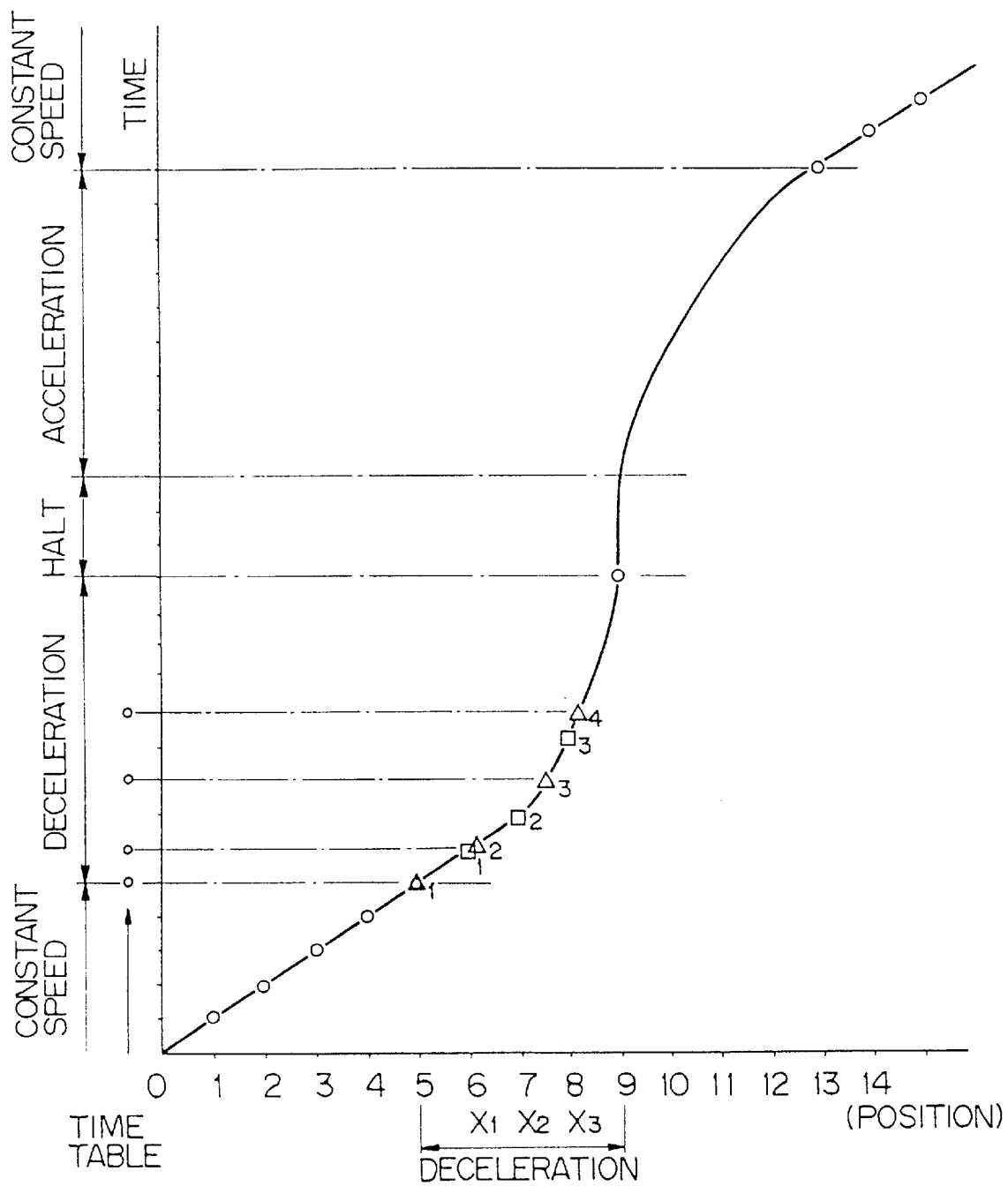

Fig. 7

$$\Delta 1 = \begin{pmatrix} D\Delta 1\text{-}1 \\ D\Delta 1\text{-}2 \\ D\Delta 1\text{-}3 \\ D\Delta 1\text{-}4 \\ \cdot \\ \cdot \\ D\Delta 1\text{-}N \end{pmatrix}$$

$$\Delta 2 = \begin{pmatrix} D\Delta 2\text{-}1 \\ D\Delta 2\text{-}2 \\ D\Delta 2\text{-}3 \\ D\Delta 2\text{-}4 \\ \cdot \\ \cdot \\ D\Delta 2\text{-}N \end{pmatrix}$$

$$\square 1 = \begin{pmatrix} A_1 \times D\Delta 1\text{-}1 + (1-A_1) \times D\Delta 2\text{-}1 \\ A_1 \times D\Delta 1\text{-}2 + (1-A_1) \times D\Delta 2\text{-}2 \\ A_1 \times D\Delta 1\text{-}3 + (1-A_1) \times D\Delta 2\text{-}3 \\ A_1 \times D\Delta 1\text{-}4 + (1-A_1) \times D\Delta 2\text{-}4 \\ \cdot \qquad\qquad\qquad \cdot \\ \cdot \qquad\qquad\qquad \cdot \\ A_1 \times D\Delta 1\text{-}N + (1-A_1) \times D\Delta 2\text{-}N \end{pmatrix}$$

N IS A PIXEL NUMBER IN ONE SCANNING LINE 5,818,979

IMAGE SCANNER AND IMAGE SCANNING METHOD USING SAME

This application is a continuation of application Ser. No. 08/425,770, filed Apr. 20, 1995, now abandoned, which is a continuation of application Ser. No. 08/133,223, filed Oct. 7, 1993, now abandoned.

BACKGROUND OF THE INVENTION

1. Field of the Invention

The present invention relates to an Image scanner and an image scanning method using the same wherein an image is read electronically and image data is obtained.

2. Description of the Related Art

Recently it has been required to scan an image using an image scanner and process the read image data by utilizing a computer, wordprocessor or the like. The high speed image reading of the related arts has resulted in an unbalance between the image scanner and a host system causing problems.

In particular, when the reading speed of an image scanner is higher than the processing speed of the host system, the unbalance between them must be reduced. As a countermeasure, usually a buffer memory stores image data from the image scanner, or the image reading operation is interrupted when the host system overflows.

An effective and easy countermeasure is that the image data is stored in a buffer memory and the stored data is then transmitted at the processing speed of the host system. However, currently there is a tendency to increase the resolution of an image or to scan color images. For this reason, image data becomes enormous and the cost of a buffer memory for one image frame becomes prohibitive.

Thus, as a simpler and more economical measure, an interrupt function wherein the read operation is temporarily interrupted, is provided. In the above apparatus, a further development for the processing of the image data accompanying a halt preparation, halt, and restart of reading, must be carried out.

Because the mechanical system including a drive motor (stepper motor) which is used in the sub-scanning which is necessary for reading an image, generates an irregular movement or vibrations during an acceleration or deceleration due to inertia, since the image signal from the image reading element (e.g., charge coupled device) is processed electronically, a balance therebetween cannot be achieved.

SUMMARY OF THE INVENTION

An object of the present invention is to provide an image scanner and an image scanning method capable of assuring continuity of an image read at high speed and with high precision, when the scanning process is interrupted.

According to a first aspect of the present invention there is provided an image scanner having a reading head for reading image data, a drive motor for driving the reading head to scan the image and generate image data, a motor drive circuit for driving the drive motor, and a control circuit for controlling the drive motor through the motor drive circuit and controlling the reading head. The control circuit further comprises a means for weighting a plurality of image data when the drive motor is decelerating or accelerating, and for obtaining correct data to maintain the continuity of an image, when the reading operation is restarted after being interrupted.

It is preferable that the control circuit further comprises a means for selecting image data during deceleration or acceleration of the drive motor before or after the drive motor interrupts a scanning operation by using a sampling table and for providing correction to give continuity of the image data by weighting or averaging the selected image data.

It is preferable that the control circuit comprises a timing table for determining read timing when the drive motor is decelerating or accelerating, and a means for converting the reading data to data as read in a normal scanning state.

It is preferable that the control circuit be provided with separate timing tables for determining the read timing of the image data, corresponding to the deceleration state or the acceleration state of the drive motor.

It is preferable that the control circuit comprises a table designating the weighting factor of the image data when the drive motor is accelerating or decelerating.

According to a second aspect of the present invention there is provided an image scanning method using an image scanner having a reading head, a drive motor for moving the reading head, a motor drive circuit, and a control circuit for controlling the above elements and for reading an image, comprising a processing step for weighting image data when the drive motor is decelerating or accelerating to maintain normal continuity of the image data when reading is restarted after the control circuit interrupts the reading operation, from a host unit, to avoid overflow of the scanner.

It is preferable that the method further comprises a process step for selecting the image data during deceleration or acceleration of the drive motor before or after the drive motor interrupts the scanning process, by using a sampling table, before the processing step for weighting the image data.

Other features and advantages of the invention will be apparent from the following description with reference to the accompanying drawings.

BRIEF DESCRIPTION OF THE DRAWINGS

FIG. 6 is a graph showing operating characteristics of a first embodiment of the invention;

FIG. 7 is a diagram for explaining a calculation process in a data correction by matrix expression according to the first embodiment of the invention;

DESCRIPTION OF THE PREFERRED EMBODIMENTS

Prior to explaining the embodiments, the related arts are explained with reference to the attached drawings.

Figure 1:
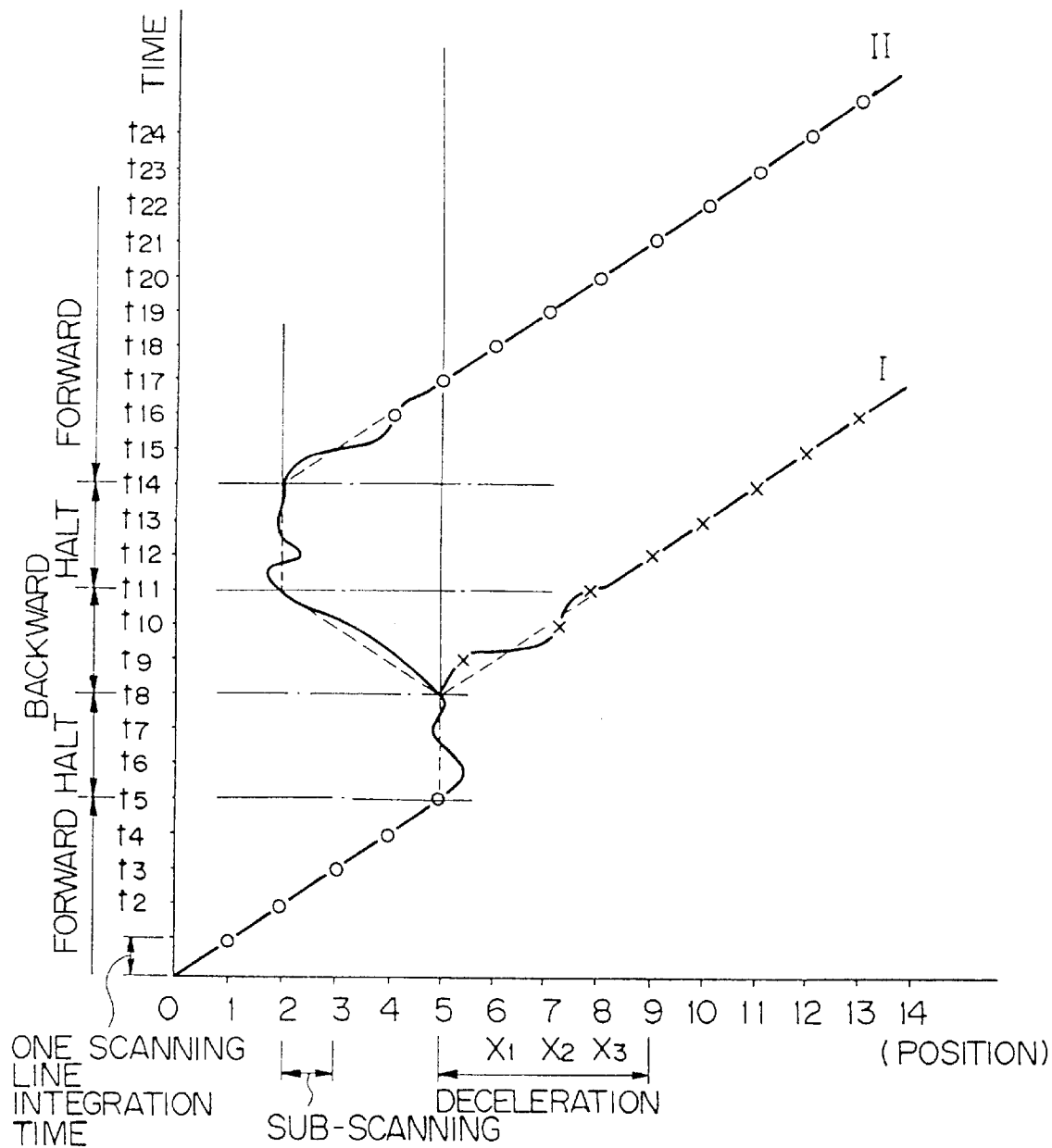
FIG. 1 is a first characteristic diagram showing an operation of an image scanner according to a related art.

In FIG. 1 explaining a first prior art countermeasure, a method for interrupting a reading operation is shown. In this method, prior to the restart of the reading operation, a reading device is returned from a halted position.

Based on a relative movement between an image original and a reading head, the image signals are read sequentially from a point of origin O as shown by O marks in the figure. During one interval of the abscissa scale, sub-scanning is executed and it is assumed, in this case, that the scanning halts at the position 5. The image integration time of one scanning line is designated by one scale division of the ordinate. In this example, the read operation goes to time $t_5$ and halts until time $t_8$.

After that when read restart conditions are partially satisfied, if the reading restart from time $t_8$ as shown by the mark x without the motor going back, the correct signal cannot be obtained because of the effect of irregular mechanical movements, at least until the reading device reaches reading position 7 or 8 as shown by curve I.

Accordingly, when the reading restarts, the drive motor moves back to the position indicated by 2 in abscissa, after the drive motor halts, the readings are as shown by curve II, and the reading of the image signal restarts from the position 4 at which point the irregular movements have been eliminated. The drive motor goes back from times $t_8$ to $t_{11}$ of the ordinate, halts until time $t_{14}$, and then proceeds step by step. If there is a great amount of play in the mechanical system, a longer preliminary backing operation than that of FIG. 1 is necessary.

In the above process, at the positions 4 and 5, the overlapping reading operations are repeated. By averaging these data, more faithful image data can be acquired.

This method is used mainly with low speed scanners. Because of the overlap of backing up the reading head and rescanning, the total reading time increases.

Figure 2:
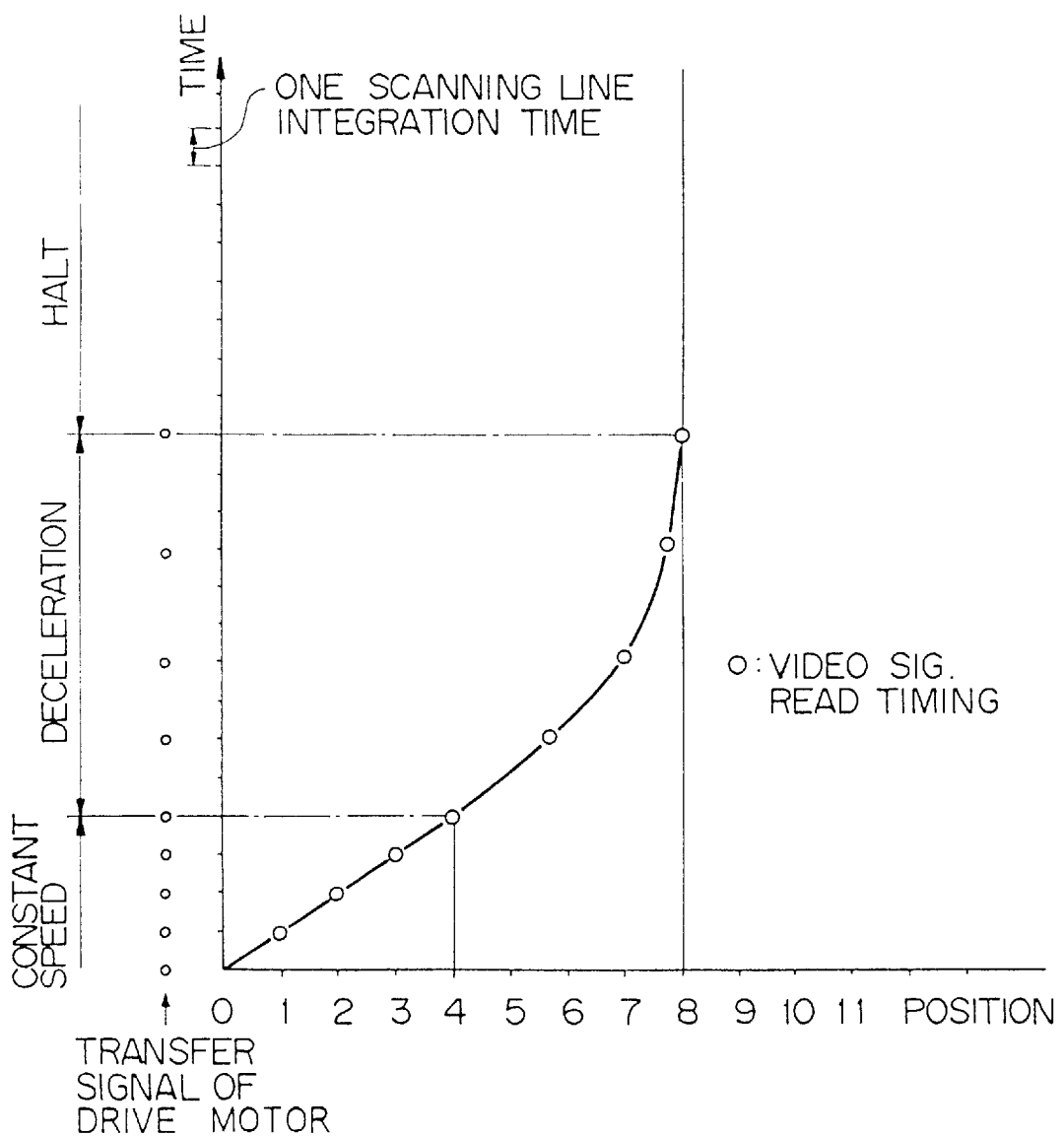
FIG. 2 is a second characteristic diagram showing an operation of an image scanner according to a related art.

In FIG. 2, another countermeasure in the related arts is shown. This method is used by a high speed scanner. In consideration of the characteristics of the drive motor, the reading of the data is carried out. In this method, reading restarts at the timing of an SH (shift pulse) (not shown in the figure) signal which designates the beginning of a scanning line just after the beginnings of a transfer signal for accelerating or decelerating.

In this case, during the acceleration of the drive motor, both mechanical movement and the video signal reading operation are delayed. During the deceleration, the mechanical system is apt to lead because of the inertia thereof. For this reason, fluctuations in the image data are easily generated.

Figure 3:
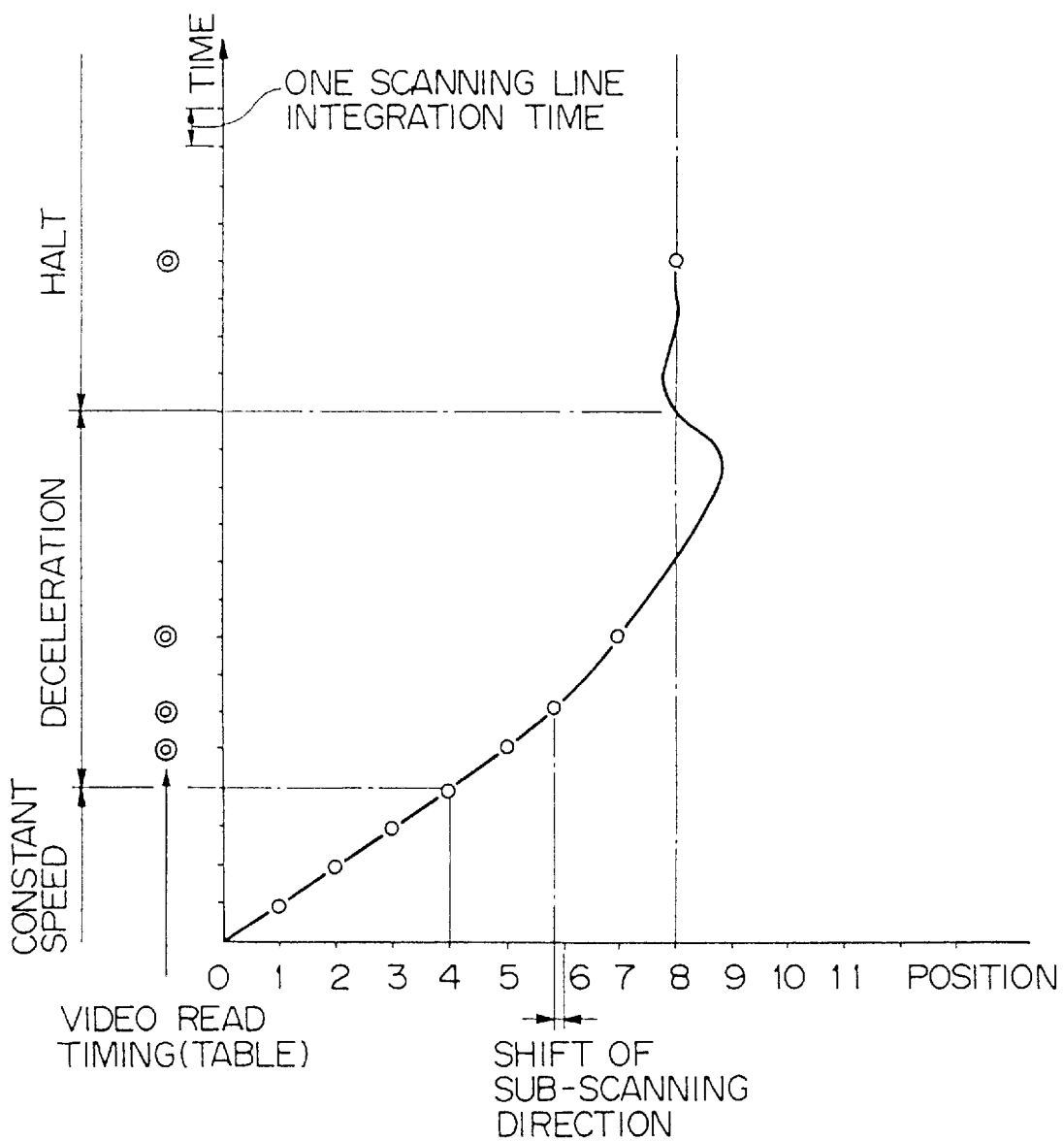
FIG. 3 is a third characteristic diagram showing an operation of an image scanner according to a related art.

FIG. 3 shows a countermeasure in another related art. This method is preferable for high speed scanning. In this method, the determination of a timing for reading a video signal is made by utilizing a time table when a drive motor is accelerated or decelerated. This method refers to the time table (conf. mark ⊚) in response to the acceleration or deceleration of the drive motor and the video signal is read (conf. mark ○) in accordance with content of the referred table.

In this method, when the drive motor is accelerating or decelerating, since the SH timing is not synchronized with the reading position, there is a drawback that the video signal leads or lags by a maximum of ½ step in the sub-scanning direction.

Next, a summary of the present invention is given with reference to the attached drawings.

Figure 4:
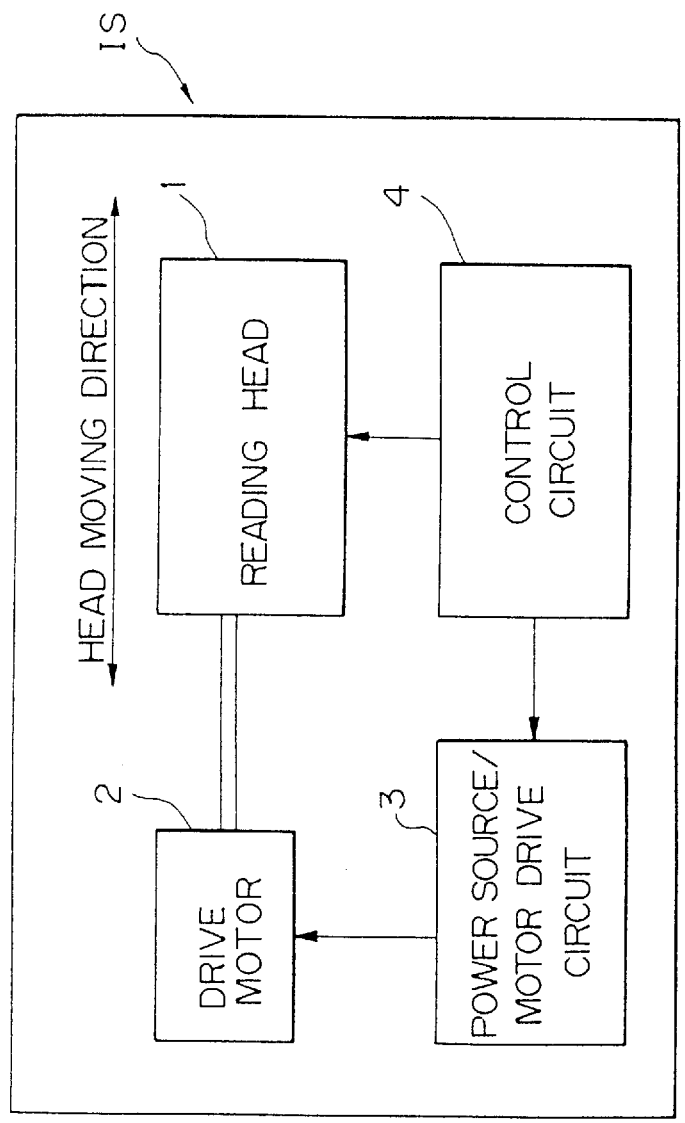
FIG. 4 is a schematic block diagram showing a constitution of an image scanner according to embodiments of the present invention.

FIG. 4 is a schematic block diagram of the constitution of the present invention. In the figure reference numeral 1 is a reading head, which reads an image on an image original (not shown). A reference numeral 2 is a drive motor, which moves a carrier including the reading head and executes a sub-scanning.

Reference numeral 3 indicates a power source and motor driving circuit and supplies necessary pulse outputs to the drive motor 2. Reference numeral 4 indicates a control circuit, which supplies the necessary control signal to the reading head 1 and the power source and motor drive circuit 3.

The control circuit 4 supplies the necessary signals for halting and restarting the reading operation of the reading head 1 and for the power source/motor drive circuit 3.

The control circuit 4 includes a time table corresponding to the acceleration or deceleration characteristics of the drive motor 2 and further includes a factor table which is necessary to weight or average the obtained image data.

In an image scanner IS according to this invention, various operations from the halting of reading of image data to reading restart are executed in response to a sequential control signal from the control circuit. The function of halting the reading operation is executed by a read halt command which is generated when a condition by which the host unit interrupts the reading of the image data, is detected.

The time table for the correction of position and time is referred to in response to the read halt command, and the averaging or weighting processes of the image data are carried out. Thus, a decrease in the precision of the output data due to the halting of the image scanner is eliminated.

The averaging or weighting process of the image data can be performed by calculation or by selection of a factor from the factor table.

Figure 5:
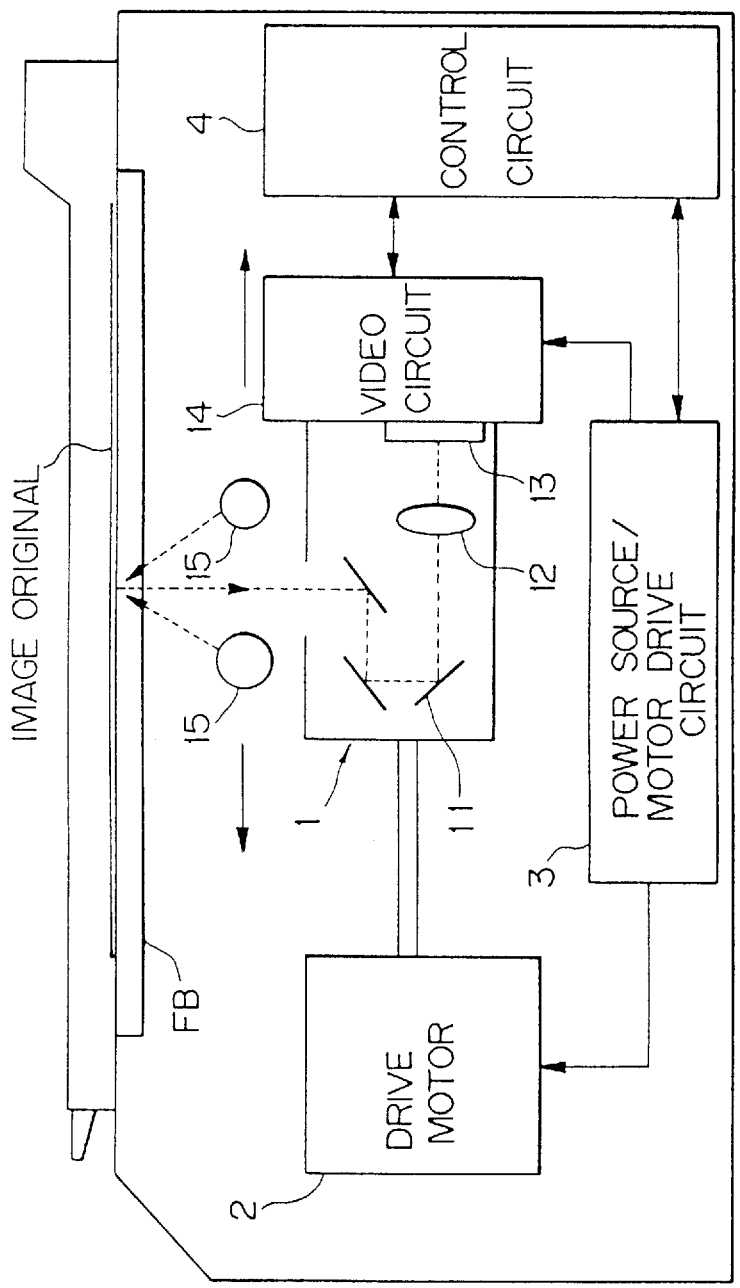
FIG. 5 is a detailed diagram showing a constitution of the image scanner in FIG. 4.

Hereinafter, embodiments of an image scanner according to the present invention are explained with reference to the appended figures. FIG. 5 shows an embodiment of the invention based on the constitution of FIG. 4. This embodiment, which reads an original image on a flat bed FB, is a flatbed type image scanner. In addition to this type of scanner, there is a scanner having a series of roller mechanisms which transmit the image originals, however, the explanation of the scanner is abbreviated in this description.

A reading head 1 forms an image on a photo-electric conversion element 13 by an optical system including a reflecting mirror group 11 and a lens 12, and image data is obtained from a video circuit 14. For example, a CCD can be utilized as a photo-electric conversion element 13. To obtain sufficient reflected light from the image original, a light source 15, e.g., a fluorescent lamp, xenon lamp, or the like is provided.

The CCD in the reading head 1 is a line sensor, and scans electrically in a vertical direction in relation to the drawing sheet as a main scanning. Further, in each scanning operation, a sub-scanning is carried out in the right and left directions in relation to the drawing sheet by a drive motor 2 (stepper motor). The main scanning and the sub-scanning operations scan the entire surface of the image original, and the image data corresponding to each pixel is obtained from the video circuit 14.

The drive motor 2 is driven by a power source/motor drive circuit 3 under control of a control circuit 4. The control circuit 4 comprises elements for controlling start, halt, and acceleration and deceleration of the drive motor; elements for controlling the reading timing of the video circuit 14; elements for controlling the drive motor for sub-scanning; and the like.

The operational characteristics when the image scanner is interrupted, according to the invention, are shown by the graph in FIG. 6. In the figure, the ordinate shows time and the abscissa shows position. Reading at a constant speed is executed from an origin O to a position 5, and the deceleration is started from the position 5 at which point the halt command is issued.

In this embodiment, the deceleration is carried out during three steps and after that the motor stops. As shown by the graph, the drive time becomes longer in response to the deceleration. During the deceleration term, the read operation is continued and image data such as $\Delta_1$, $\Delta_2$, $\Delta_3$, and $\Delta_4$ are obtained.

If it is assumed that the read timing is constant as usual, the read image data is shifted from a normal signal by the effect of the deceleration in the drive portion. Thus, in this invention, the time table for determining the read timing (circle marks along the left side of the ordinate in FIG. 6) when the carrier including the reading head 1 decelerates or accelerates, is provided in the control circuit 4, and the image data $\Delta_1$, $\Delta_2$, $\Delta_3$, and $\Delta_4$ are read in accordance with the above timing. This time table is determined based on mass of the reading head, drive motor characteristics, and the like.

However, since the image data $\Delta_1$, $\Delta_2$, $\Delta_3$, and $\Delta_4$ are not normal image signals, the image data must be corrected. The correction is processed by the following operation. The corrected image data are shown by $\square_1$, $\square_2$, and $\square_3$ in the graph in FIG. 6. The corrected data $\square_1$, $\square_2$, and $\square_3$ are arranged at equidistant positions $X_1$, $X_2$, and $X_3$ along the abscissa, respectively.

$$\square_1 = (A_1) \times \Delta_1 + (1-(A_1)) \times \Delta_2 \quad \text{(data at } X_1\text{)}$$

$$\square_2 = (A_2) \times \Delta_2 + (1-(A_2)) \times \Delta_3 \quad \text{(data at } X_2\text{)}$$

$$\square_3 = (A_3) \times \Delta_3 + (1-(A_3)) \times \Delta_4 \quad \text{(data at } X_3\text{)}$$

In the above, $A_i = A_1, A_2, A_3$ are coefficients for weighting the image data when the carrier decelerates (or accelerates), and $0 \leq A_i \leq 1$.

The number of scanning lines of the data $\Delta$ is the same as the number of steps when decelerating. $\square$ and $\Delta$ designate one line of information from the main scanning lines, and the above calculation is carried out for each pixel data as shown in FIG. 7.

Figure 8:
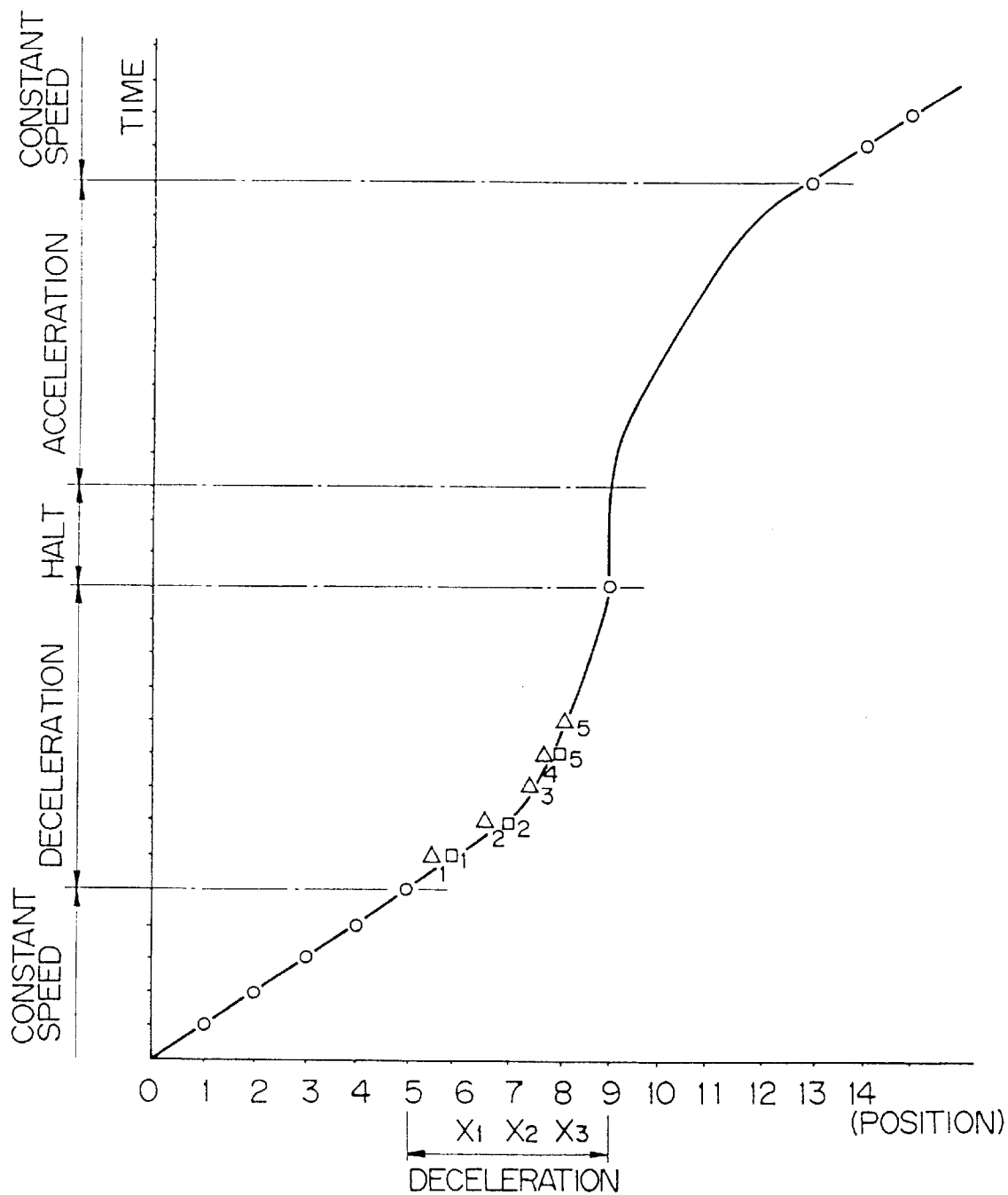
FIG. 8 is a graph showing operating characteristics of a second embodiment of the invention.

In FIG. 8, a second embodiment is shown. In this embodiment, more accurate correction than the first embodiment is possible, and in particular, the reproduction of the data at the almost halted state is excellent. In this case, the number of scanning lines is different from the above embodiment. Then, the contents of the time table are set so that the data reading is carried out when the SH signal is generated at the nearest position to the scaled portion on the abscissa.

When deceleration (or acceleration) of the carrier starts, the time table is referred to, and the effective data $\Delta_1$, $\Delta_2$, $\Delta_3$, $\Delta_4$, and $\Delta_5$ are read. The read positions are shifted by the phase-lead (lag), vibration, etc. Accordingly, to convert to the data $X_1$, $X_2$, and $X_3$ on the abscissa, the following calculations are executed.

$$\square_1 = (A_{11}) \times \Delta_1 + (A_{12}) \times \Delta_2 + (A_{13}) \times \Delta_3 +$$
$$(A_{14}) \times \Delta_4 + (A_{15}) \times \Delta_5 \ldots \text{data at } X_1$$
$$\square_2 = (A_{21}) \times \Delta_1 + (A_{22}) \times \Delta_2 + (A_{23}) \times \Delta_3 +$$

-continued
$$(A_{24}) \times \Delta_4 + (A_{25}) \times \Delta_5 \ldots \text{data at } X_2$$
$$\square_3 = (A_{31}) \times \Delta_1 + (A_{32}) \times \Delta_2 + (A_{33}) \times \Delta_3 +$$
$$(A_{34}) \times \Delta_4 + (A_{35}) \times \Delta_5 \ldots \text{data at } X_3$$

where, $A_{ij} = A_{11}, A_{12}, \ldots, A_{35}$ are coefficients for weighting the image data when the carrier decelerates (or accelerates) and $0 \leq A_{ij} \leq 1$.

In the figure, the following coefficients i.e., $A_{13}$, $A_{14}$, $A_{15}$, $A_{21}$, $A_{24}$, $A_{25}$, $A_{31}$, $A_{32}$, and $A_{33}$ are zero, and the others are between 0 and 1.

In the first and second embodiments, the case of deceleration is mainly explained. On the contrary, in the case of acceleration, the process is generally the reverse of the decelerating process. However, the operation of the mechanical system, including the reading head leads in phase when decelerating and lags in phase when accelerating, so the operation is not exactly reversed. Further, vibration occasionally occurs, so to provide more precision, a separate table is preferably provided.

Figure 9:
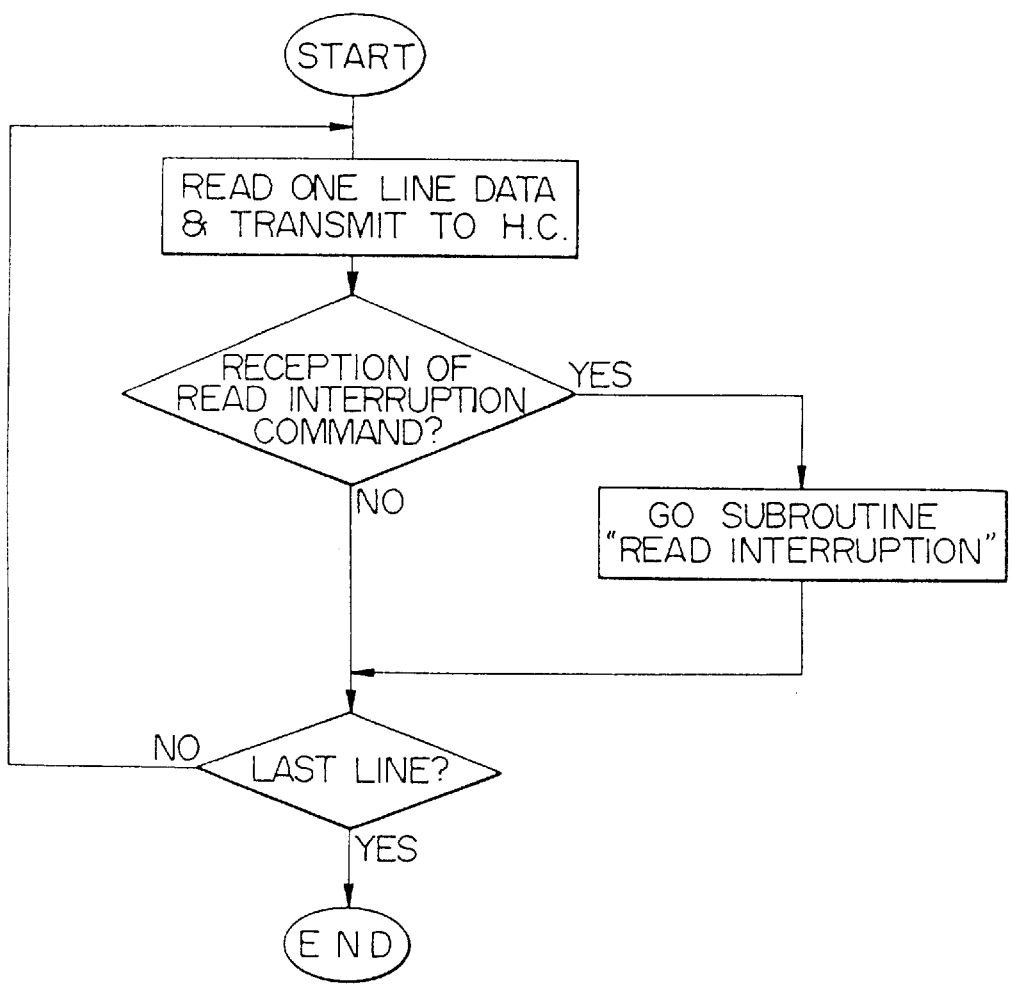
FIG. 9, FIG. 10 and FIG. 11 are flowcharts showing a process according to the first embodiment of the invention.
Figure 10:
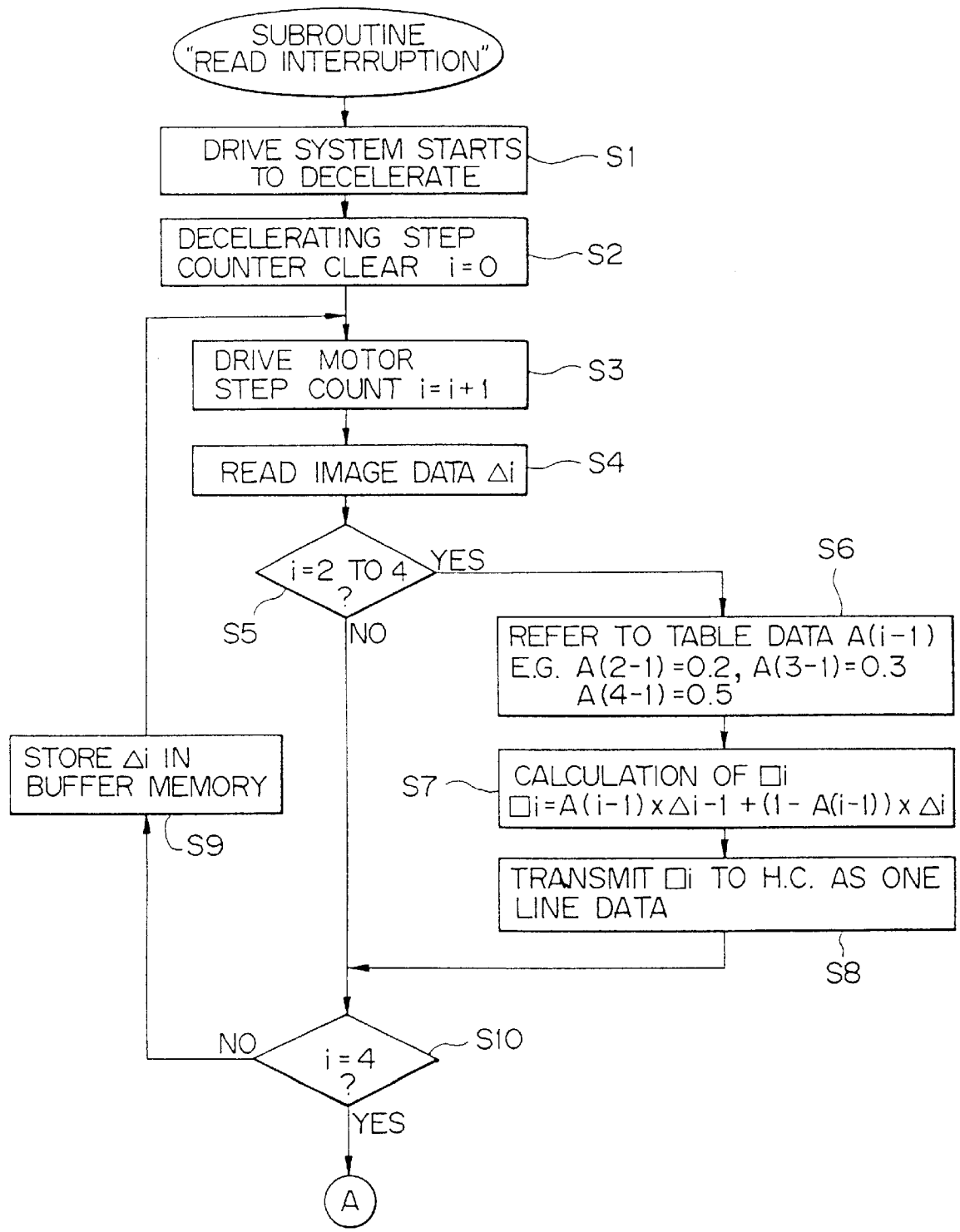
Figure 11:
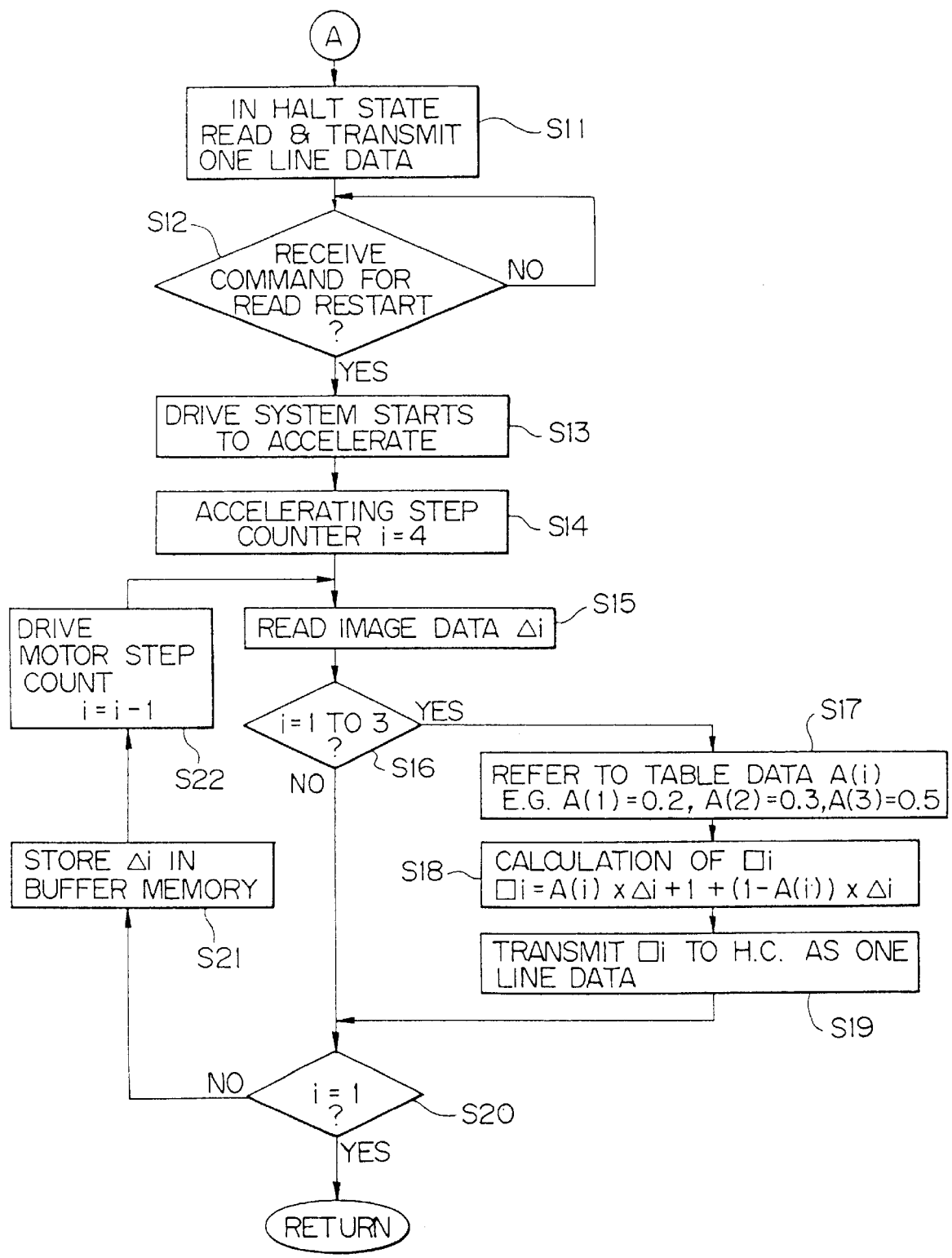

The process of the first embodiment is explained next with reference to FIG. 9, FIG. 10 and FIG. 11. FIG. 9 is a flowchart for explaining a reading process of the image data as a main routine. In this process, for the reason explained before, the CPU generates a reading interrupt command; when the command is received the process goes to a subroutine, and the process shown in FIG. 10 and FIG. 11 is executed. If no interrupt command is generated, the image scanner reads the image data line by line, and the read image data is transmitted to a host computer (H.C.). When the reading and transmission are performed up to the last line, the process ends.

When the process goes to the read interrupt process, as shown in FIG. 10, the deceleration of the drive system (stepper motor) starts (Step 1 (S1)). Next, in step 2 (S2), the decelerating step counter of the drive motor is cleared (i=0). Next, in step 3 (S3), the step counter of the drive motor is incremented at the start of deceleration (i→i+1). In the next step 4 (S4), the image data $\Delta_i$ is read. In the next step 5 (S5), if i is 2 to 4, the process goes to step 6 (S6), and if i is not 2 to 4, the process goes to step 10 (S10). In the step 6, the table data $A_{(i-1)}$ is referred to. For example, if i=2, $A_{(i-1)} = A_{(2-1)} = 0.2$, if i=3, $A_{(i-1)} = A_{(3-1)} = 0.3$ and if i=4, $A_{(i-1)} = A_{(4-1)} = 0.5$. The above table data is determined by simulation or experiment. In the next step 7 (S7), the data $\square_i$ is calculated. $\square_i = A_{(i-1)} \times \Delta_{i-1} + (1 - A_{(i-1)}) \times \Delta_i$. In the next step 8 (S8), $\square_i$ is transmitted to the H.C. as one line data. Next, the process goes to the step 10.

In the step 10, if i=4, the process goes to step 11 (S11) in FIG. 11, and if i≠4, the process goes to step 9 (S9). In the step 9, $\Delta_i$ is stored in a buffer memory, and then the process returns to the step 3.

In the step 11, one line data at the halt position is read and transmitted to the H.C. In the next step 12 (S12), when the command to restart reading receives, the process goes to step 13 (S13), when the command is not received, the process is held at the step 12. In the step 13, the driving system (stepper motor) starts to accelerate. In next step 14 (S14), the acceleration step counter i in the drive motor is set to 4. In next step 15 (S15), the image data $\Delta_i$ is read. Next, the process goes to step 16 (S16). In the step 16, if i is 1 to 3, the process goes to step 17 (S17), if i is not 1 to 3, the process goes to step 20 (S20).

In the step 17, the table data $A_{(i)}$ is referred to. For example, $A_{(1)} = 0.2$, $A_{(2)} = 0.3$ and $A_{(3)} = 0.5$. This table data is determined by simulation or experiment. In next step 18 (S18), data $\square_1$ is calculated. Namely, $\square_i = A_{(i)} \times \Delta_{i+1} + (1 - A_{(i)}) \times \Delta_i$. Next, the process goes to step 19 (S19), and $\square_i$ is transmitted to the H.C. as one line data.

In the next step 20, if i=1, this subroutine is returned to and if i≠1, the process goes to step 21 (S21). In the step 21, $\Delta_i$ is stored in a buffer memory. Next, the process goes to step 22 (S22), and the step count i of the drive motor from the acceleration start is i−1. After the step 22, the process returns to the step 15.

Figures 12, 17:
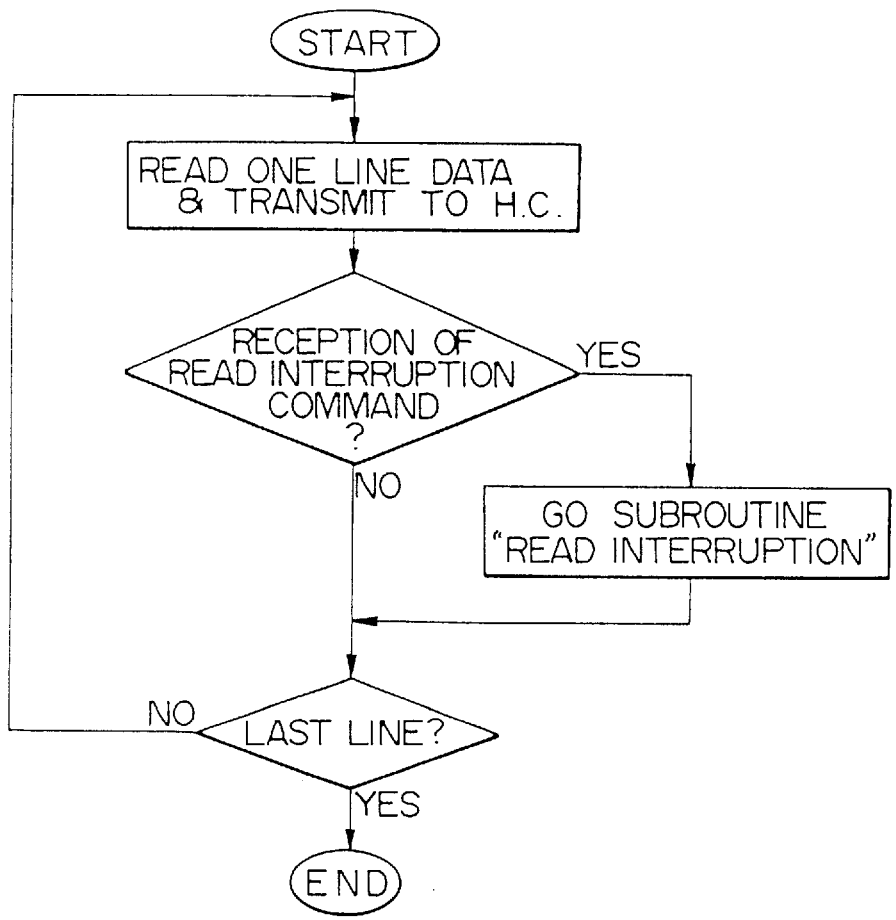
FIG. 12, FIG. 13, FIG. 14, FIG. 15 and FIG. 16 are flowcharts showing a process according to the second embodiment of the invention.
FIG. 17 is an explanatory diagram showing, for example, weights of $A_{(i,j)}$ in FIGS. 12 to 16.

A process of the second embodiment is explained next with reference to flowcharts (FIG. 12, FIG. 13, FIG. 14, FIG. 15, FIG. 16, and FIG. 17). To processes flowchart in FIG. 12 corresponds to FIG. 9 in the first embodiment and FIG. 12 is the same as FIG. 9, accordingly the explanation is abbreviated.

Processes as a subroutine of the second embodiment are explained with reference to FIG. 13, FIG. 14, FIG. 15, FIG. 16, and FIG. 17.

Figure 13:
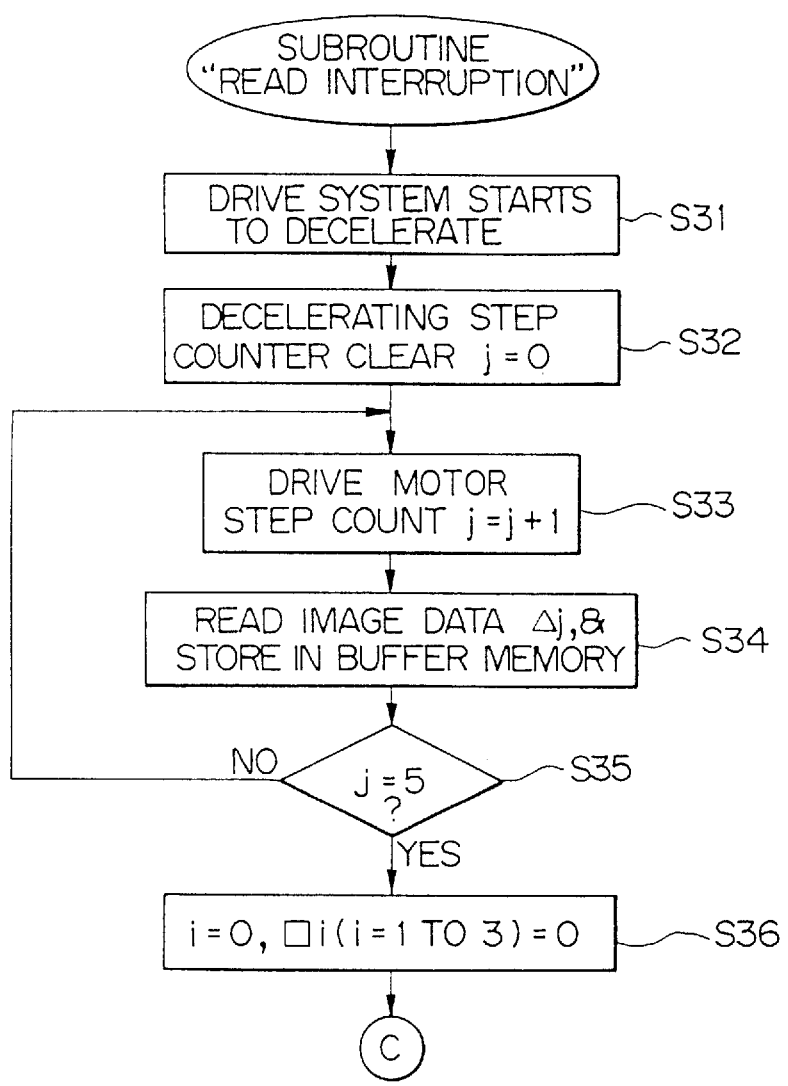
Figure 14:
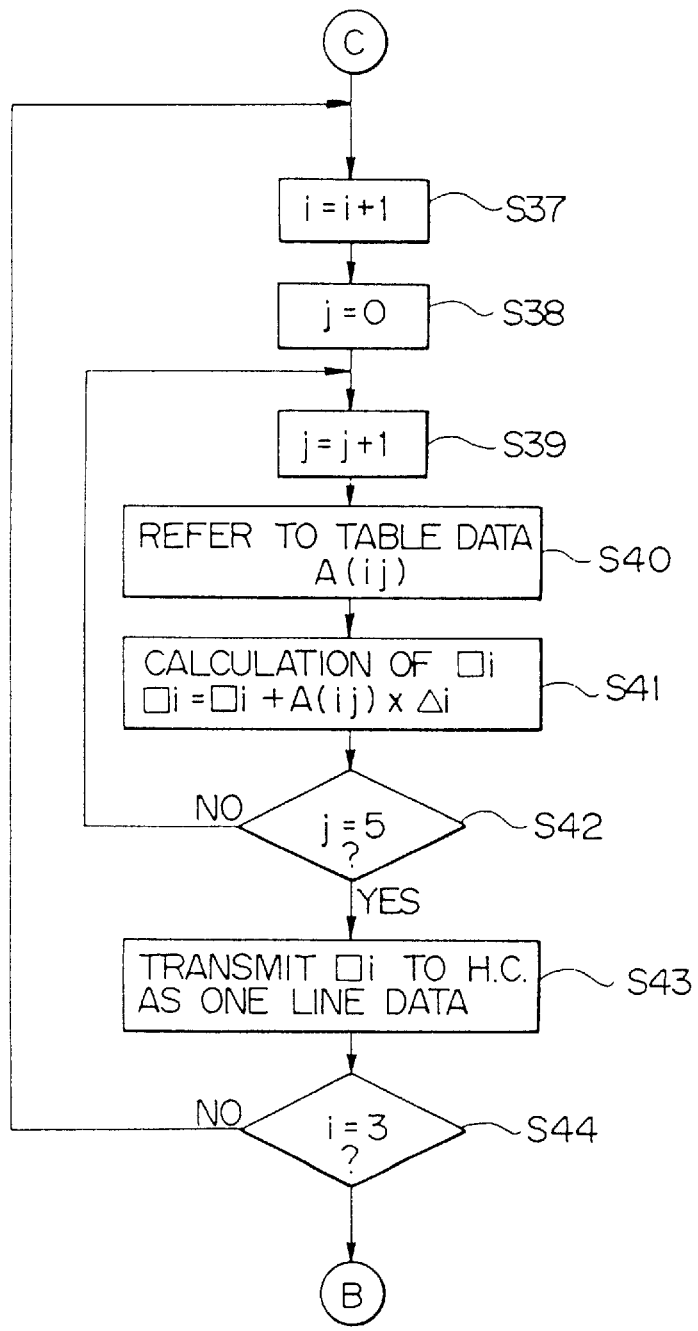

In FIG. 13, a read interrupt subroutine starts from step 31 (S31). In the step 31, the deceleration of the drive system (stepper motor) starts. In the next step 32 (S32), the deceleration step counter in the drive motor is cleared. Namely, j=0. In next step 33 (S33), the step counter of the drive motor is incremented at the start of the deceleration. Namely, j→j+1. In next step 34 (S34), the image data $\Delta_j$ is read and is stored in a buffer memory. In the next step 35 (S35), if j=5, the process goes to step 36 (S36), if j≠5, the process returns to the step 33. In the step 36, i=0 and $\square_i$ (i=1 to 3)=0. In the next step, the process goes to step 37 (S37) in FIG. 14.

In the step 37, i is incremented (i→i+1), in step 38 (S38), j is set to zero (j→0), in step 39 (S39), j is incremented (j→j+1), and in step 40 (S40), as an example, table data $A_{(ij)}$ (FIG. 17) is referred to. The table data is determined by simulation or experiment. Next, in step 41 (S41), data $\square_i$ is calculated. The data $\square_i$ is $\square_i + A_{(ij)} \times \Delta_i$. In the next step 42 (S42), if j=5, the process goes to step 43 (S43), if j≠5, the process returns to the step 39. In the step 43, $\square_i$ is transmitted to the H.C. as one line data. In next step 44 (S44), if i=3, the process goes to step 45 (S45) (FIG. 15), and if i≠3, the process returns to the step 37.

Figure 15:
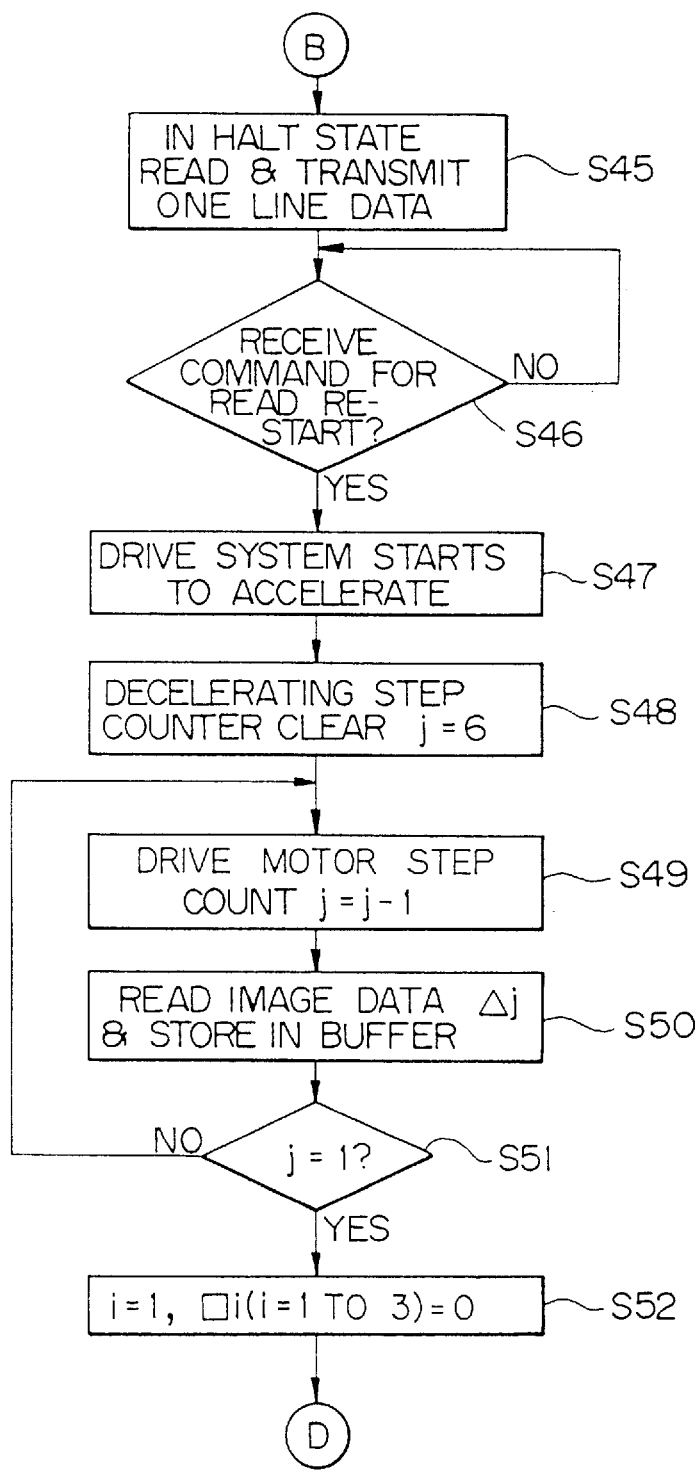

In the step 45 in FIG. 15, one line data at the halted position is read and transmitted. In step 46 (S46), the process is held until the read restart command is received, and when the command is received, the process goes to step 47 (S47). In the step 47, the drive system (stepper motor) starts to accelerate. In the next step 48 (S48), the deceleration step counter of the drive motor is cleared and j=6 is set. In the next step 49 (S49), the step counter of the drive motor is decremented at deceleration start, namely, j→j−1. In the next step 50 (S50), the image data $\Delta_j$ is read and is stored in the buffer memory. In the next step 51 (S51), if j=1, the process goes to step 52 (S52), if j≠1, the process returns to the step 49. In the step 52, i is set to 1 (i→1) and if i=1, i=2, i=3, $\square_i$ is set to zero ($\square_i$ (i=1 to 3)=0).

Figure 16:
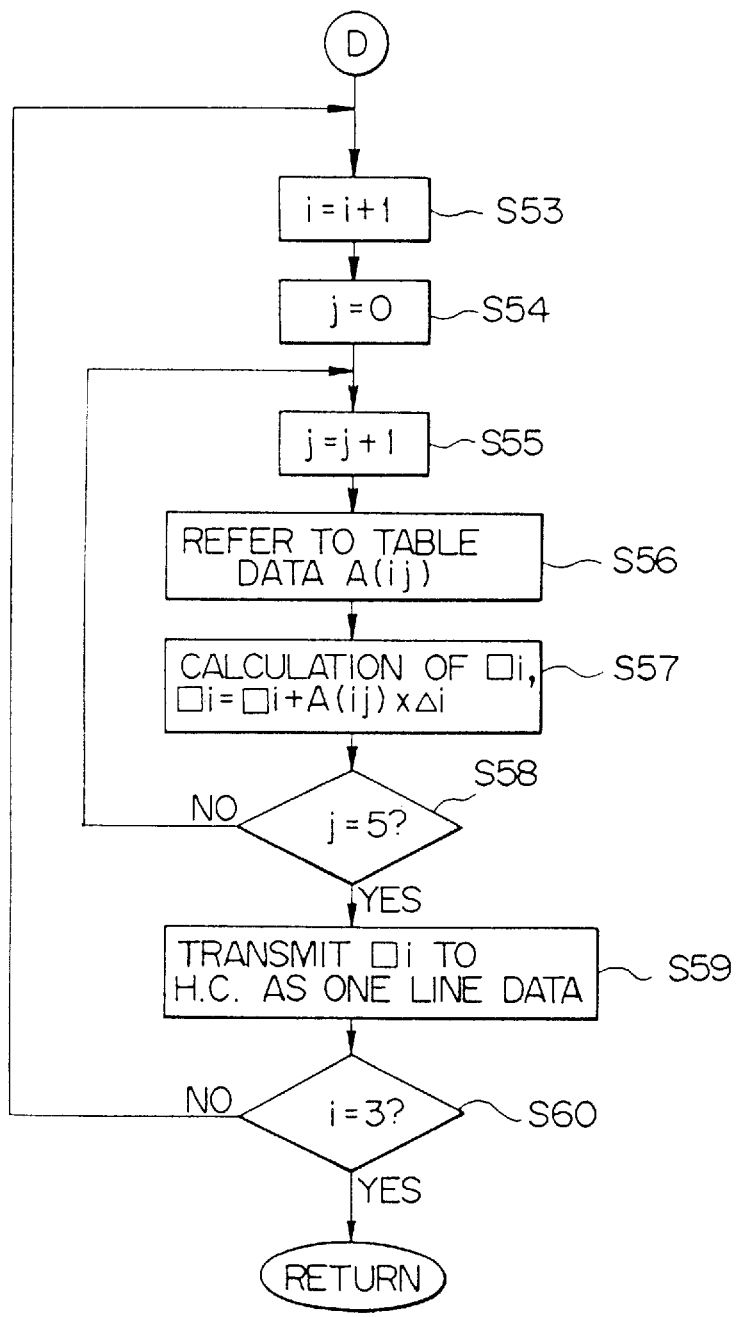

After the step 52, the process goes to step 53 (S53) in FIG. 16. In the step 53, i is incremented (i→i+1). In the next step 54 (S54), j→0 is executed and the process goes to step 55 (S55). In the step 55, j is incremented (j→j+1). In the next step 56 (S56), a table data $A_{(ij)}$ is referred to. This value is shown, for example, in FIG. 17. In the next step 57 (S57), data $\square_i$ is calculated. $\square_i$ is updated as $\square_i + A_{(ij)} \times \Delta_i$. In the next step 58 (S58), if j=5, the process goes to step 59 (S59), and if j≠5, the process goes to the step 55. In the step 59, the image correction data $\square_i$ is transmitted to the H.C. as one line data. In the next step 60 (S60), if i=3, the process returns to the main routine, and if i≠3, the process returns to the step 53.

By using the image scanner according to the invention, when the read operation is restarted after being interrupted, the image data remains uniform and no reduction in speed occurs. Further, a buffer memory corresponding to a one page image to be scanned is not necessary, and fine image data can be obtained using only a memory having a capacity corresponding to the scanning lines, scanned during the deceleration or acceleration.

Accordingly, an image scanner having a high precision and high stability and low cost can be obtained.

I claim:

1. An image scanner comprising:
   a reading head reading image data;
   a drive motor for scanning an image source by using the reading head;
   a motor drive circuit driving the drive motor; and
   a control circuit controlling the drive motor through the motor drive circuit and controlling the reading head, wherein the control circuit further comprises:
      means for weighting a plurality of image data which are read by the reading head during the time in which the reading head is decelerating or accelerating, when the drive motor, which moves the reading head, is decelerating or accelerating, by calculation of the image data, and
      means for obtaining corrected data to maintain continuity of the image.

2. An image scanner as set forth in claim 1, wherein the control circuit further comprises:
   means for selecting image data during deceleration or acceleration of the drive motor before or after the drive motor interrupts the scanning process, by using a sampling table; and
   means for correcting the selected image data to give continuity to the image data using weighting by calculation of the image data.

3. An image scanner as set forth in claim 1, wherein the control circuit comprises:
   a timing table for determining read timing when the drive motor is decelerating or accelerating; and
   means for converting the read data to conform to a normal scanning state.

4. An image scanner as set forth in claim 2, wherein the control circuit comprises:
   a timing table for determining read timing when the drive motor is decelerating or accelerating; and
   means for converting the read data to conform to a normal scanning state.

5. An image scanner as set forth in claim 1, wherein the control circuit is provided with separate timing tables for determining the read timing of the image data, corresponding to the deceleration state or the acceleration state of the drive motor.

6. An image scanner as set forth in claim 2, wherein the control circuit is provided with separate timing tables for determining the read timing of the image data, corresponding to the deceleration state or the acceleration state of the drive motor.

7. An image scanner as set forth in claim 3, wherein the control circuit is provided with separate timing tables for determining the read timing of the image data, corresponding to the deceleration state or the acceleration state of the drive motor.

8. An image scanner as set forth in claim 4, wherein the control circuit is provided with separate timing tables for determining the read timing of the image data, corresponding to the deceleration state or the acceleration state of the drive motor.

9. An image scanner as set forth in claim 3, wherein the control circuit comprises a table designating the weighting factor of image data when the drive motor is accelerating or decelerating.

10. An image scanner as set forth in claim 4, wherein the control circuit comprises a table designating the weighting factor of image data when the drive motor is accelerating or decelerating.

11. An image scanner as set forth in claim 1, wherein the control circuit further comprises:

means for selecting image data during deceleration or acceleration of the drive motor before or after the drive motor interrupts the scanning process, by using a sampling table; and means for correcting a selected image data to give continuity to the image data using averaging by calculation of the image data.

12. An image scanning method using an image scanner having a reading head, a drive motor, a motor driving circuit, and a control circuit for controlling the above elements and for reading an image original, comprising:

a processing step for weighting image data, which are read by the reading head during the time in which the reading head is decelerating or accelerating, when the drive motor for driving the reading head is decelerating or accelerating to maintain normal continuity of the image data.

13. An image scanning method as set forth in claim 12, further comprising a process step for selecting image data during deceleration or acceleration of the drive motor before or after the drive motor interrupts the scanning process, by using a sampling table, before the processing step for weighting the image data.

14. An image scanner comprising:

a reading head reading image data;

a drive motor for scanning an image source by using a reading head;

a motor drive circuit driving a drive motor; and a control circuit controlling the drive motor through the motor drive circuit and controlling the reading head, wherein the control circuit further comprises:

means for weighting a plurality of image data, which are read by the reading head during the time in which the reading head is decelerating or accelerating, when the drive motor, which moves the reading head, is decelerating or accelerating, by selection of a factor of the image data, and means for obtaining corrected data to maintain continuity of the image.

15. An image scanner as set forth in claim 14, wherein the control circuit further comprises:

means for selecting image data during deceleration or acceleration of the drive motor before or after the drive motor interrupts the scanning process, by using a sampling table; and means for correcting the selected image data to give continuity to the image data using weighting.

16. An image scanner as set forth in claim 14, wherein the control circuit further comprises:

means for selecting image data during deceleration or acceleration of the drive motor before or after the drive motor interrupts the scanning process, by using a sampling table; and means for correcting a selected image data to give continuity to the image data using averaging.

17. An image scanner comprising:

a reading head reading image data;

a drive motor for scanning an image source by using a reading head;

a motor drive circuit driving a drive motor; and a control circuit controlling the drive motor through the motor drive circuit and controlling the reading head to read image data when movement of the reading head is constant, decelerating or accelerating, wherein the control circuit further comprises:

means for weighting a plurality of image data, which are read by the reading head during the time in which the reading head is decelerating or accelerating, when the drive motor, which moves the reading head, is decelerating or accelerating, by calculating weighting coefficients for the image data in response to a changing in speed of the reading head, and means for obtaining corrected data to maintain continuity of the image.

18. An image scanner as set forth in claim 17, wherein the control circuit further comprises:

means for selecting image data during deceleration or acceleration of the drive motor before or after the drive motor interrupts the scanning process, by using a sampling table; and means for correcting the selected image data to give continuity to the image data using weighting.

19. An image scanner as set forth in claim 17, wherein the control circuit further comprises:

means for selecting image data during deceleration or acceleration of the drive motor before or after the drive motor interrupts the scanning process, by using a sampling table; and means for correcting a selected image data to give continuity to the image data using averaging.

* * * * *